April 10, 1928.
M. S. WEAVER
MEANS FOR SERVING FOOD AND DRINK
Filed May 26, 1925
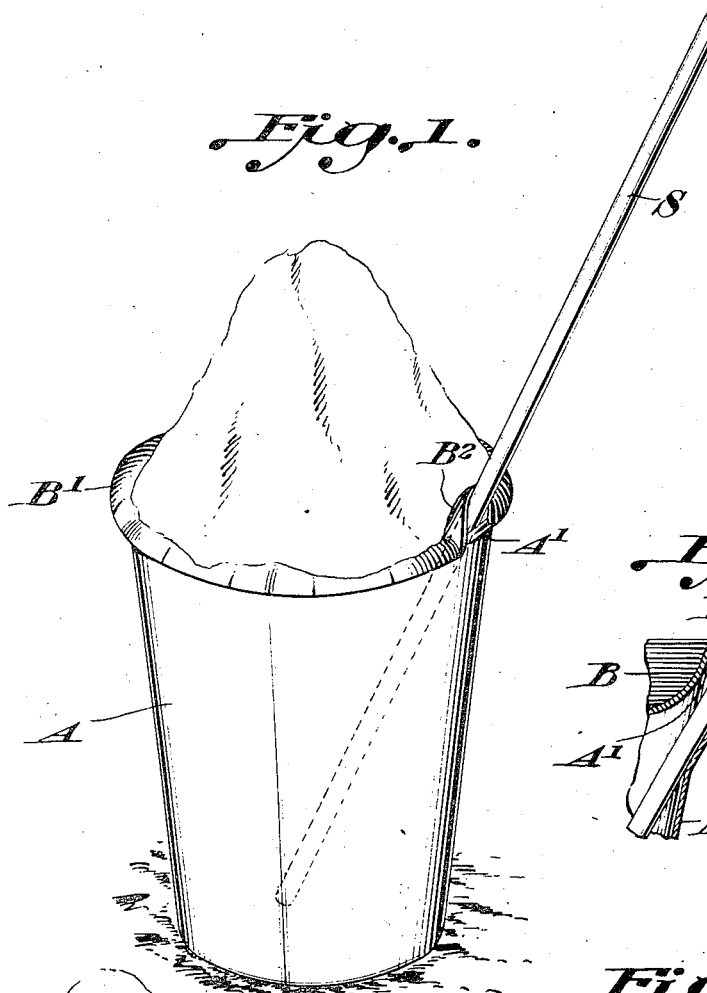
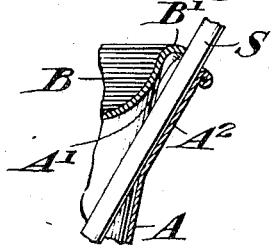
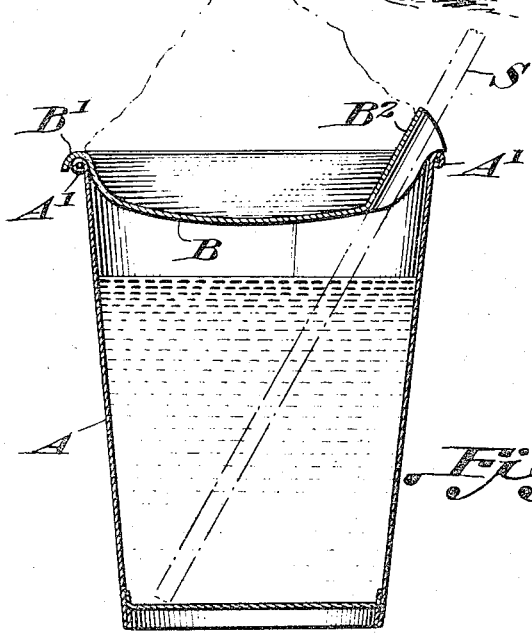
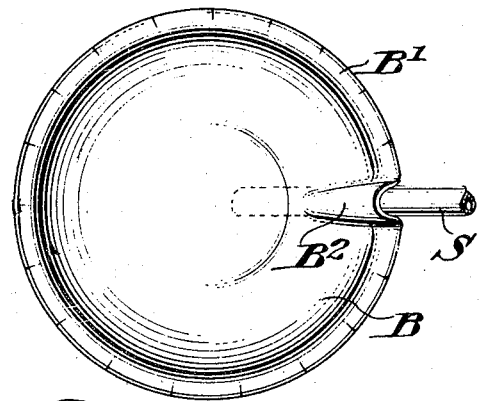
1,665,289
Inventor;
Marvin S. Weaver
By Cyrus Kehr
Atty.

Patented Apr. 10, 1928.

1,665,289

UNITED STATES PATENT OFFICE.

MARVIN S. WEAVER, OF ABERDEEN, NORTH CAROLINA.

MEANS FOR SERVING FOOD AND DRINK.

Application filed May 26, 1925. Serial No. 33,013.

My invention relates to receptacles used for serving at soda fountains and other places where ice cream and other foods and beverages are served to people.

The object of the invention is to provide in form for convenient handling a structure adapted to contain food and beverage, the structure being also adapted to be held by the hand and the food and the beverage taken interchangeably from the structure by the customer. To this end, the structure comprises a cup and a dish formed and associated as hereinafter described, the cup being designed to contain a beverage, while the dish is designed to contain a food.

In the accompanying drawings,

Fig. 1 is a perspective of a structure embodying my invention;

Fig. 2 is an upright section through the same structure;

Fig. 3 is a plan of the structure, only the dish and a straw showing;

Fig. 4 is an upright section of a part of the upper end of the structure showing the dish and the rim of the cup shaped to make a space or orifice for the insertion of a straw.

Referring to said drawings, A is a cup having at its upper end a rim, $A^1$. B is a dish of proper size to be fitted into the upper end of the cup, the dish having a rim, $B^1$, downward curved to fit over the rim, $A^1$, of the cup. The cup and the dish may be made of any sheet-form material, preferably paper or a similar cheap and light material. The cup may be such a paper cup as is now in use in public places. The dish and perhaps also the cup might be made of baked dough or batter, the material of which ice cream cones are ordinarily made. But the cup should not be made of a material which is easily dissolved by a liquid. If either member of the structure is made of baked dough or batter, that structure is composed of edible material and is an edible member.

In the forms shown in Figs. 1, 2 and 3, the outer part of the dish is bent or folded upward at $B^2$ to form a channel or orifice through which a straw, S, may be extended downward into the cup.

For serving, the beverage is put into the cup. Then the dish, filled with ice cream or other food, is seated on the cup. Then a straw is inserted through the orifice formed by the fold, $B^2$. Then the customer may hold the cup in one hand and with the other hand, by the aid of a spoon, eat the ice cream or other food from the dish and at desired intervals, partake of the beverage through the straw.

In Fig. 4, the cup is shown as having a fold, $A^2$, to provide a channel or orifice for the insertion of the straw.

In both forms shown by the drawings, the structure is orificed or provided with an orifice for the insertion of a straw into the cup.

It is to be understood that the dimensions of the cup and the dish may be varied to provide for desired capacity.

I claim as my invention,

1. A structure comprising two members, one being a cup and the other being a dish shaped to extend into the upper part of the cup and to seat loosely on the rim of the cup and having all of its lip higher than the lip of the cup and one of said members having a lip fold whereby an orifice is formed between the cup and the dish for the insertion of a straw.

2. A structure comprising two members, one being a cup and the other being a dish shaped to extend into the upper part of the cup and to seat loosely on the rim of the cup and having all of its lip higher than the lip of the cup and the dish having a lip fold whereby an orifice is formed between the cup and the dish for the insertion of a straw.

3. A paper structure comprising two members, one being a cup and the other being a dish shaped to extend into the upper part of the cup and to seat loosely on the rim of the cup and having all of its lip higher than the lip of the cup and one of said members having a lip fold whereby an orifice is formed between the cup and the dish for the insertion of a straw.

4. A paper structure comprising two members, one being a cup and the other being a dish shaped to extend into the upper part of the cup and to seat loosely on the rim of the cup and having all of its lip higher than the lip of the cup and the dish having a lip fold whereby an orifice is formed between the cup and the dish for the insertion of a straw.

In testimony whereof I have signed my name, this 25th day of May, in the year one thousand nine hundred and twenty-five.

MARVIN S. WEAVER.